United States Patent
Hode

(10) Patent No.: US 11,881,620 B2
(45) Date of Patent: Jan. 23, 2024

(54) METHOD FOR DECOUPLING SIGNALS IN TRANSCEIVER SYSTEMS

(71) Applicant: THALES, Courbevoie (FR)

(72) Inventor: Jean-Michel Hode, Pessac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 17/121,363

(22) Filed: Dec. 14, 2020

(65) Prior Publication Data
US 2021/0184347 A1 Jun. 17, 2021

(30) Foreign Application Priority Data
Dec. 12, 2019 (FR) ...................................... 1913650

(51) Int. Cl.
*H01Q 1/52* (2006.01)
*H04B 17/21* (2015.01)
*H04B 1/04* (2006.01)
*H04B 1/525* (2015.01)
*H04B 7/06* (2006.01)

(52) U.S. Cl.
CPC ........... *H01Q 1/525* (2013.01); *H04B 1/0475* (2013.01); *H04B 1/525* (2013.01); *H04B 7/0617* (2013.01); *H04B 17/21* (2015.01)

(58) Field of Classification Search
CPC .................................................... H01Q 1/525
See application file for complete search history.

(56) References Cited

U.S. PATENT DOCUMENTS

| | | | | |
|---|---|---|---|---|
| 6,004,015 A | * | 12/1999 | Watanabe | H04R 25/70 700/28 |
| 6,041,290 A | * | 3/2000 | Matt | H04M 9/082 702/194 |
| 8,081,945 B2 | | 12/2011 | Crilly, Jr. et al. | |
| 10,116,485 B1 | * | 10/2018 | Liu | H04B 17/17 |
| 10,225,112 B1 | | 3/2019 | Doane | |
| 2005/0215193 A1 | * | 9/2005 | Kummetz | H04B 7/15585 455/1 |
| 2006/0057999 A1 | * | 3/2006 | Behzad | H03D 7/1458 455/313 |

(Continued)

OTHER PUBLICATIONS

Foreign Communication from a Related Counterpart Application, French Examination Report dated Nov. 2, 2020, French Application No. FR1913650 filed on Dec. 12, 2019.

*Primary Examiner* — Hsinchun Liao
(74) *Attorney, Agent, or Firm* — Conley Rose P.C.

(57) ABSTRACT

The invention relates to a method for characterizing the effects of coupling of a radiofrequency transceiver apparatus comprising at least one transmit path and at least one receive path, and to an apparatus implementing the method. The method comprises the calculation of coefficients of a correcting filter, with the steps of: transmitting a known signal over a transmit path, receiving a signal over a receive path, calculating the coefficients of the correcting filter on the basis of the known signal and of the signal received over said receive path. The method further comprises a step, carried out during the transmission of a useful signal over the transmit path, of filtering the signal transmitted over the transmit path by means of said correcting filter in order to determine the transmitted signal received by coupling effect over the receive path.

15 Claims, 8 Drawing Sheets

(56) References Cited

U.S. PATENT DOCUMENTS

2012/0263215 A1* 10/2012 Peng .................... H04B 1/0475
375/221
2014/0086356 A1* 3/2014 Azadet .................... H04L 25/03
375/295

* cited by examiner

METHOD FOR DECOUPLING SIGNALS IN TRANSCEIVER SYSTEMS

CROSS-REFERENCE TO RELATED APPLICATIONS

This application claims priority to French Application No. 1913650 filed in the French Patent Office on Dec. 12, 2019 and entitled, "Method for Decoupling Signals in Transceiver Systems", the entirety of which is incorporated herein by reference.

TECHNICAL FIELD

The field of the invention is that of telecommunications, radar and electronic warfare and relates more particularly to a method for decreasing parasitic interference generated by coupling effects for devices transmitting and receiving radiofrequency (RF) signals, in particular when transmission and reception take place simultaneously.

PRIOR ART

FIGS. 1a and 1b show the basic diagrams of architectures of apparatuses according to the prior art that are intended to transmit and receive RF signals, comprising one antenna for FIG. 1a, and two antennas for FIG. 1b.

These apparatuses comprise a circuit 101 carrying out any specific digital processing. They also comprise:
- a transmit chain 121 configured to convert the digital signal to be transmitted into an analogue signal via a digital-to-analogue converter, or DAC, and to, if necessary, amplify the RF signal to be transmitted and transpose it to the transmission carrier frequency,
- a receive chain 122 configured to, if necessary, transpose the received RF signal to an intermediate frequency or to baseband, and to digitize it via an analogue-to-digital converter, or ADC.

Depending on the way in which the apparatus is implemented, the processing of the transmit chain may be enriched with a step of modulating the signal to be transmitted and/or with one or more steps of interpolating the signal, in particular when the processing is carried out at a rate lower than the sampling frequency of the DAC. Similarly, the processing of the receive chain may be enriched with a step of demodulating and/or one or more steps of filtering/decimating the received signal, in particular when the processing is carried out at a rate lower than the sampling frequency of the ADC.

In the case of FIG. 1a, the apparatus comprises a single antenna 102 used both for transmission and for reception. In the case of FIG. 1b, the apparatus comprises two distinct antennas: one antenna 111 used for the transmission of the RF signal, and one antenna 112 used for the reception of the RF signal.

The dynamic range of such systems is, by nature, smaller than that of a conventional receive chain, where transmission and reception take place in a sliced manner, i.e. alternately. Specifically, the receive chain of the system must simultaneously process the received signals, in general of low level, and the transmitted signal received over the receive antenna 102 or 112 by coupling effect. In the case of FIG. 1a, the coefficient of coupling may be characterized by the coefficient of reflection $S_{11}$ of the antenna 102. In the case of FIG. 1b, the coefficient of coupling may be characterized by the coefficient of transmission $S_{21}$ of the antenna system 111/112. Letting R denote the coefficient of coupling, i.e. $S_{11}$ or $S_{21}$ as the case may be, and G the gain provided by the processing 101, then the dynamic range available for the reception of the signal is equal to the intrinsic dynamic range of the receive chain decreased by 20 $\log_{10}$ (G×R).

Independently of the problem of dynamic range decrease, which is not always prohibitive since its importance is to be evaluated according to the need in terms of dynamic range of the target application, an important problem arises from the high value of the relative level of coupling which may lead to partial or total masking of the received signal, depending on the processing gain. This masking interferes with, or even prevents, correct measurement of the received signal, and may lead to instability (oscillation) of the looped assembly.

The solutions of the prior art to the problem of masking of reception by transmission typically consist in slicing transmission and reception times, i.e. in defining the time intervals specifically reserved for transmissions and the time intervals specifically reserved for receptions. This operation makes it possible to clear time spans in which the received signal is no longer masked by the signal transmitted and reflected by the antenna. In parallel, a switch may be used to isolate the receive chain in transmission phases, and thus regain the entire dynamic range of the chain. However, in addition to a decrease in the rate of transmissions and the need to manoeuvre in an environment where the various apparatuses of the network are synchronized, this solution has the drawback that the stationarity of the system is no longer ensured: the spectrum of the transmitted signal exhibits periodic replicas, while the spectrum of the received signal is aliased. These drawbacks result in a portion of the transmitted signal being lost while the level of noise in the received signal increases.

In addition, the removal of the coupling via time slicing is effective only if the passband of the response of the chain, including the coefficient R of coupling, is wide enough that the patterns associated with the slicing are not spread. This prompts an increase in the slicing frequency and/or compensation for the coupling response C by means of a suitable compensating filter $C^{-1}$ positioned in the transmit chain, which is not necessarily achievable in practice, thereby leading to a substantial constraint on the design of the overall antenna system and the management of the transitions between transmission and reception.

A object of the invention is therefore to mitigate the drawbacks of the prior art by means of a method, which may be adaptive or not adaptive and completely digital, for eliminating the coupling, applicable to the two types of circuits described in FIGS. 1a and 1b. The described method is applicable to apparatuses that simultaneously perform transmission and reception, but also to apparatuses that slice transmission and reception, so as to remove the artefacts due to the spreading of the coupling response C during the transitions.

For this, the invention does not seek to modify the transmitted signal, but to reproduce the antenna coupling response in order reconstruct an equivalent coupled transmitted signal, used, where applicable, to isolate the received signal from the coupled signal.

SUMMARY OF THE INVENTION

To that end, the present invention relates to a method for characterizing the effects of coupling between transmit path and receive path of a radiofrequency transceiver apparatus comprising at least one transmit path and at least one receive path, the method comprising the calculation of coefficients of a correcting filter, said calculation of coefficients comprising:
- a step of transmitting a known signal over a transmit path, the known signal being used to characterize the effects of coupling in the radiofrequency transceiver apparatus,
- a step of receiving a signal over a receive path,
- a step of calculating the coefficients of the correcting filter on the basis of the known signal and of the signal received over said receive path.

The method further features a step, carried out during the transmission of a useful signal over the transmit path, of filtering the signal transmitted over the transmit path by means of said correcting filter in order to determine the transmitted signal received by coupling effect over the receive path, referred to as the equivalent coupled signal.

In one embodiment, the method comprises an additional step of calculating the difference between the signal received over the receive path and the equivalent coupled signal.

In one embodiment of the method according to the invention, the step of calculating the coefficients comprises the solving of a system of equations that is formed from a vector of power correlation between the known signal and the received signal, and an autocorrelation matrix of the known signal.

In one embodiment of the method according to the invention, the step of calculating coefficients of a correcting filter is carried out iteratively and comprises the integration of results obtained by solving a system of equations involving the known signal and the received signal minus the equivalent coupled signal. Advantageously, the system of equations is then formed from a vector of power correlation between the known signal and the received signal minus the equivalent coupled signal, and an autocorrelation matrix of the known signal.

According to one embodiment of the method according to the invention, the known signal is a white noise.

In one embodiment of the method according to the invention, the signals used to calculate the coefficients of the correcting filter are filtered by a whitening filter.

In one embodiment of the method according to the invention, the transceiver apparatus comprises a plurality of transmit paths and/or a plurality of receive paths. The coefficients of a correcting filter are then calculated for each pair of transmit and receive antennas. For each receive path, an equivalent coupled signal corresponding to each transmit path is calculated.

In one embodiment of the method according to the invention, the known signal and the useful signal are transmitted separately. Advantageously, non-linearities of the transmit path of the apparatus are modelled by a distortion model with L components, and for which a correcting filter is calculated for each component of the distortion model, the signal transmitted over the transmit path being processed independently by each of the L components of the distortion model and filtered by the respective correcting filter, the outputs of each of the L correcting filters being summed in order to determine the equivalent coupled signal.

In one embodiment of the method according to the invention, the known signal and the useful signal are transmitted simultaneously.

The invention also relates to a transceiver device for a radiofrequency signal comprising at least one transmit path and at least one receive path. The apparatus is configured to implement a method for characterizing the effects of coupling as described above.

BRIEF DESCRIPTION OF THE FIGURES

The invention will be better understood and other features, details and advantages will become more clearly apparent from reading the non-limiting description which follows, and by virtue of the appended figures, given by way of example, among which:

FIG. 7b more precisely shows the processing carried out on a receive path in the embodiment of FIG. 7a;

Identical references are used in different figures when the elements denoted are identical.

DETAILED DESCRIPTION

Figure 1A:
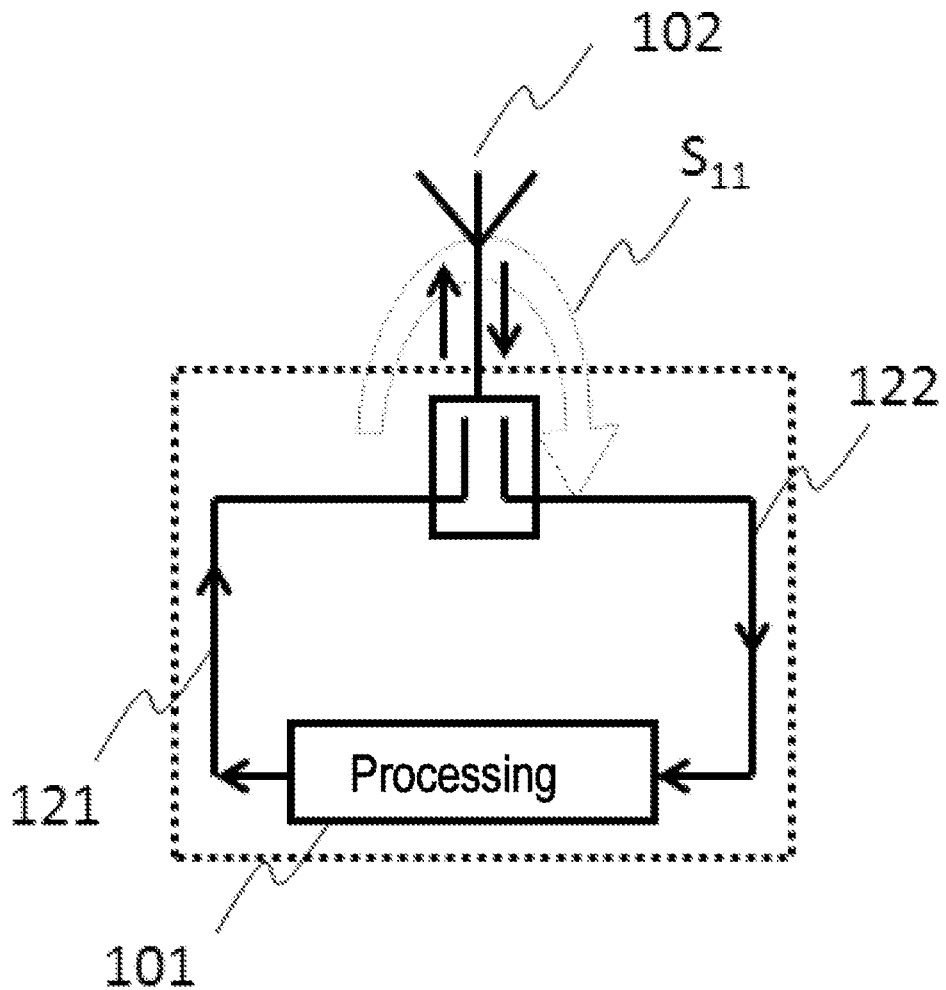
FIG. 1a is a basic diagram of a transceiver apparatus architecture according to the prior art with one antenna.
Figure 1B:
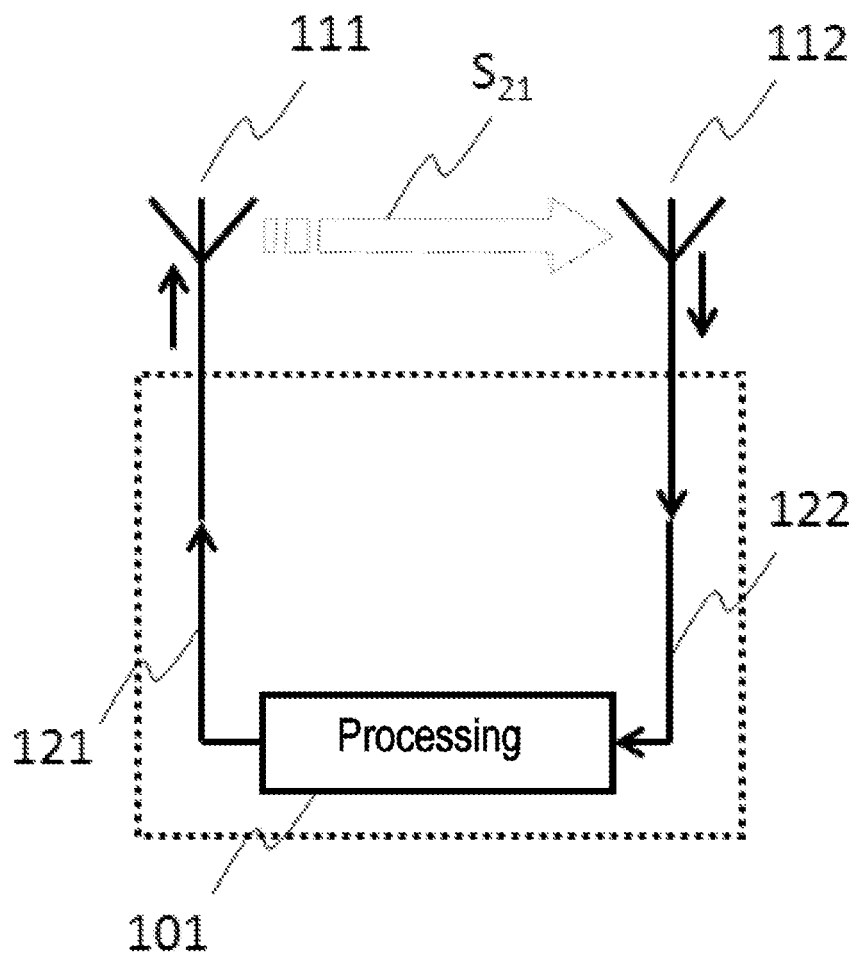
FIG. 1b is a basic diagram of a transceiver apparatus architecture according to the prior art with two antennas.
Figure 2A:
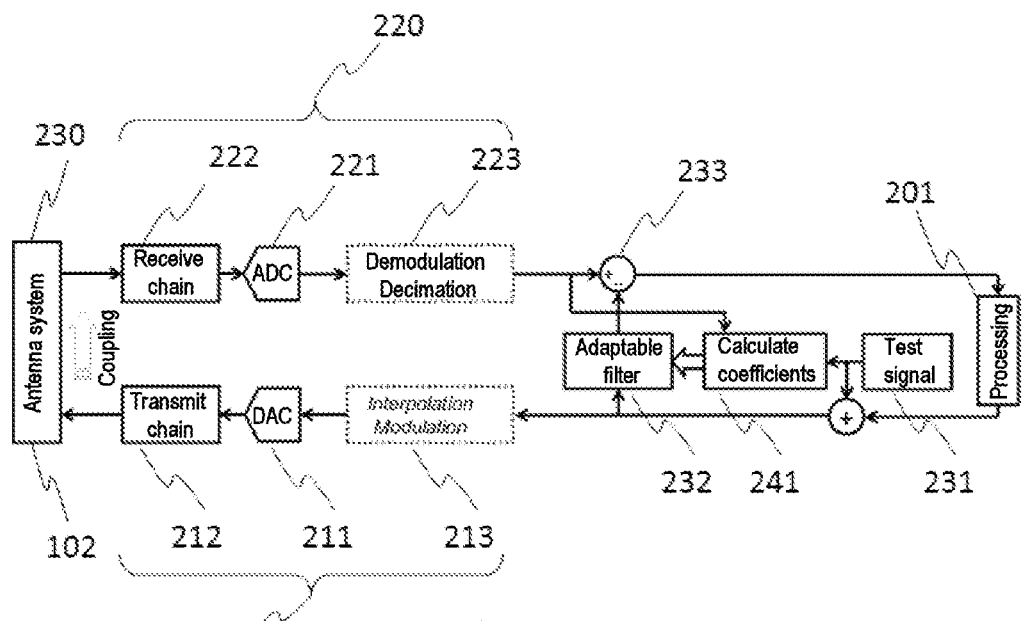
FIG. 2a schematically shows a non-adaptive embodiment of a method for decoupling signals according to the invention.
Figure 2B:
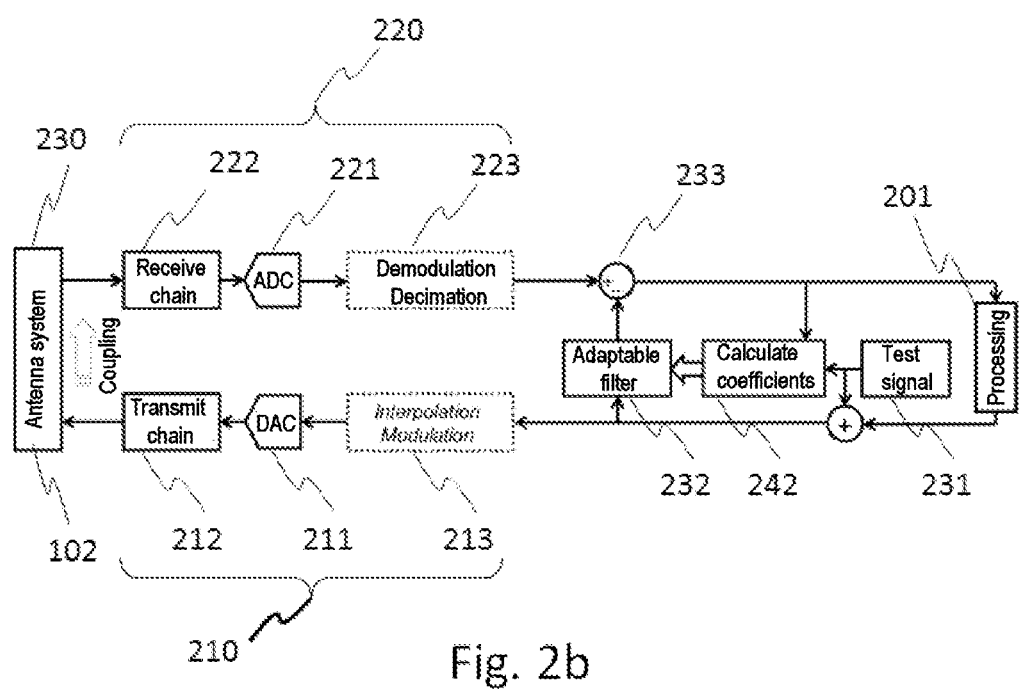
FIG. 2b schematically shows an adaptive embodiment of a method for decoupling signals according to the invention.

FIGS. 2a and 2b schematically show, respectively, non-adaptive and adaptive embodiments of a method for decoupling signals according to the invention.

The method applies to an apparatus for transmitting/receiving a radiofrequency signal comprising a digital computing device 201 carrying out the processing on the signals to be transmitted and the signals received. On the transmit path 210, the signals to be transmitted, or useful signals, are converted into analogue signals by a DAC 211 then processed by a transmit chain 212, carrying out in particular the amplification of the signals and transposing them to a carrier frequency when necessary. The receive path 220 comprises a receive chain 222 pour filtering the received signals and transposing them to baseband or an intermediate frequency when necessary, and a ADC 221 in order to convert them to analogue before their transmission to the processing device 201. The method according to the invention applies in an identical manner to shaped or non-shaped symbols, which is why the transmit path may comprise means 213 for modulating the digital signal, the receive path then comprising means 223 for demodulating the digital signal. In order to match the rate of processing of the samples to the working frequencies of the DAC 211 and of the ADC 221, the transmit path may also comprise means 213 for interpolating the signal to be transmitted, and the receive path means 223 for decimating the signal received.

The apparatus also comprises an antenna system 230, composed of one antenna used for the transmission and for the reception of the RF signals, or of two antennas, one dedicated to transmission and the other to reception.

However, the described decoupling method is not exclusively reserved for non-sliced transmit/receive chains. It may also be applied to apparatuses for which transmission and reception are sliced so as to:
  cleanly receive the signal in the half-periods dedicated to measuring reception, the proposed method making it possible in particular to remove the effects of coupling of the transmitted signal spread into the time intervals reserved for reception by coupling,
  symmetrically remove the signal received out of coupling in the time intervals reserved for transmission when the measurement of the signal received by coupling effect is desired.

The principle of the invention consists in transmitting, in addition to the useful signal, a known signal 231, or test signal, with a view to determining the impulse response of a finite-impulse-response adaptable correcting filter 232 reproducing the effects of the coupling. The transmitted signal is then filtered by this correcting filter in order to produce a signal equivalent to the coupled signal received over the receive path by coupling effect.

Depending on the embodiment, the known signal 231 may be superposed onto the useful signal, or transmitted in time intervals specifically reserved therefor.

In the case where the signal of interest is the transmitted signal received over the receive path 220 by coupling effect, it is directly available at the output of the adaptable correcting filter 232. In the case where the signal of interest is the signal received over the receive path 220 without coupling effect in order to benefit from the full dynamic range of the receive chain, it may be obtained by subtracting 233 the equivalent coupled signal generated by the adaptable correcting filter 232 from the signal received over the receive path.

In the embodiment shown in FIG. 2a, referred to as non-adaptive, the calculation 241 of the coefficients of the adaptable correcting filter 232 is performed on the basis of the known signal 231 and of the signal received over the receive path.

In the embodiment shown in FIG. 2b, referred to as adaptive, the calculation 242 of the coefficients of the adaptable correcting filter 232 is performed on the basis of the known signal 231 and of the signal received over the receive path from which the equivalent coupled signal has been subtracted.

The presented invention therefore performs a digital compensation for the coupling, using for this purpose the fact that the circuit simultaneously provides, by design, transmission and reception control, and in particular synchronization of the signals of the different paths.

In the remainder of the document, the non-adaptive and adaptive embodiments are shown simultaneously in the figures, these embodiments differing only in the signal used to calculate the coefficients and in the way in which the calculations are performed. The input for the calculations of the coefficients of the adaptable correcting filter for the non-adaptive embodiment is shown dashed, and dotted for the adaptive embodiment.

Figure 3:
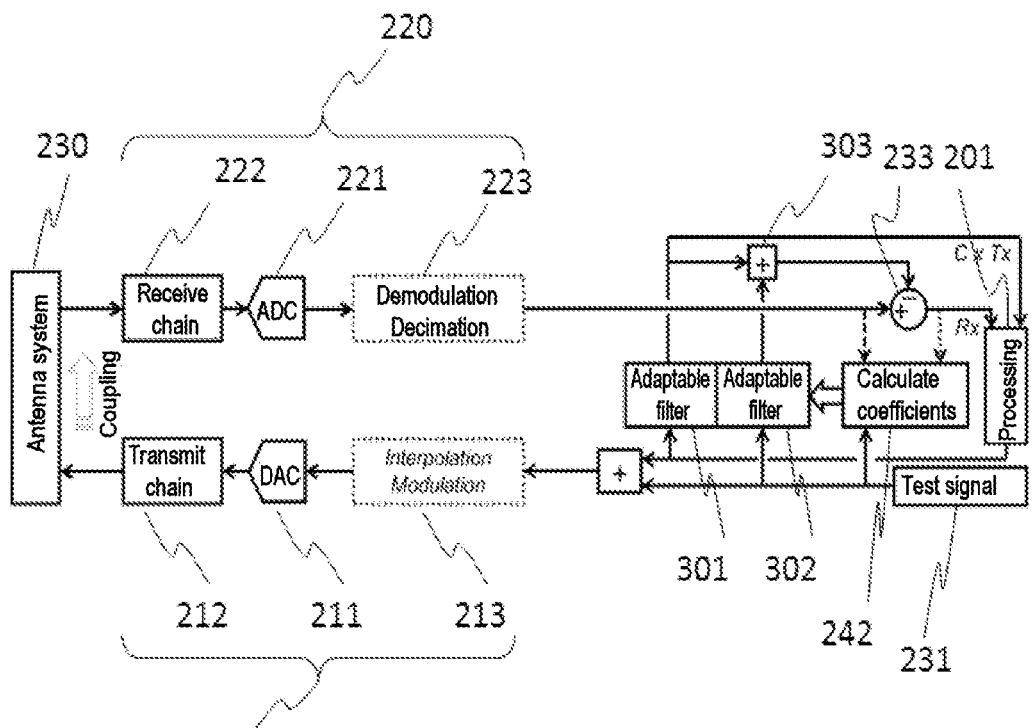
FIG. 3 schematically shows one embodiment of a method for decoupling signals according to the invention, making it possible to retrieve an estimate of the signal received by coupling and the received signal clear of the effects of the coupling.

FIG. 3 schematically shows one embodiment of a method for decoupling signals according to the invention, which is compatible with adaptive or non-adaptive operation, in which the known signal 231 is transmitted with the useful signal, and which makes it possible to retrieve both:
  an estimate of the useful signal transmitted by the transmit path and received over the receive path by coupling, and
  the signal received over the receive path from which the signal received by coupling effect has been subtracted.

For this, the known signal 231 is filtered by an adaptable correction filter 301 while the useful signal is filtered by a second adaptable correction filter 302. The two correction filters have the same coefficients, calculated in 242 by means of an adaptive or non-adaptive method. One alternative consists in implementing the two adaptable correction filters 301 and 302 through a single filter operating at twice the sampling frequency and successively processing one and then the other of the signals.

The output of the adaptable filter 301 delivers an estimate of the useful signal received over the receive path by coupling effect. This output is summed (303) with the output of the adaptable correction filter 302 in order to obtain the equivalent coupled signal received over the receive path by coupling effect. This equivalent coupled signal is then subtracted 233 from the signal received over the receive path in order to obtain a signal clear of the effects of coupling between the transmit path and the receive path.

This embodiment is particularly advantageous in the case where an aim of the device is to compare the useful signal transmitted with the useful signal received by coupling effect.

Figure 4:
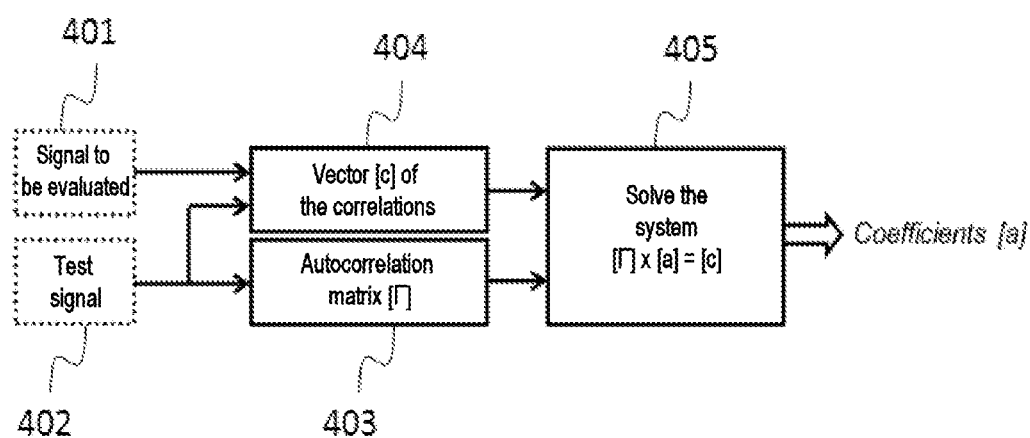
FIG. 4 schematically describes one embodiment of the calculation of the coefficients of the adaptable correction filter in a non-adaptive embodiment of the method according to the invention.

FIG. 4 schematically describes one embodiment of the calculation of the coefficients of the one or more adaptable correction filters 232 in the method according to the invention, in the non-adaptive case where the signal to be evaluated 401 used as input for the calculations is the signal received over the receive path. The calculation also takes as input the known signal 402, which may be transmitted alone or at the same time as the useful signal. The value of the coefficients [a] of the adaptable correcting filter are then given by the solution to the system of equations 405: $[\Gamma]*[a]=[c]$, with:
  $[\Gamma]$ the autocorrelation matrix 403 of the known signal over a duration equal to that of the correcting filter,
  [c] the vector of power correlation 404 between the signal to be evaluated 401 and the known signal 402 over the same duration as the autocorrelation matrix, and
  [a] the vector comprising the coefficients of the adaptable correcting filter 232. It is therefore a matter of solving the equation:

$$[a]=[c]*[\Gamma]^{-1}$$

Figure 5:
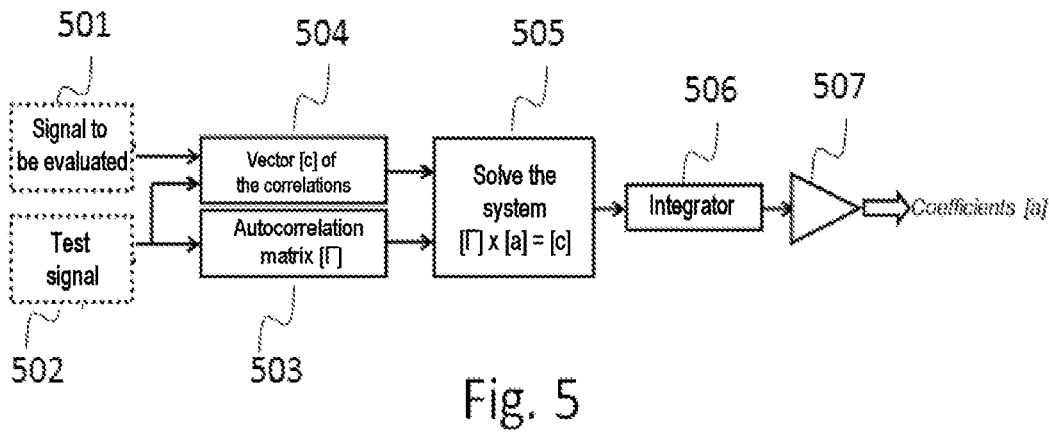
FIG. 5 schematically describes one embodiment of the calculation of the coefficients of the adaptable correction filter in an adaptive embodiment of the method according to the invention.

FIG. 5 describes one embodiment of the step of calculating the coefficients of the one or more adaptable correction filters 232 in the method according to the invention, in the adaptive case where the signal to be evaluated 501 used as input for the calculations is the signal received over the receive path from which the calculated equivalent coupled signal has been subtracted. The calculation also takes as input the known signal 502, which may be transmitted alone or at the same time as the useful signal. In a manner identical to that which is done in the adaptive case, the autocorrelation matrix $[\Gamma]$ 503 of the known signal and the vector [c] of power correlation 504 between the signal to be evaluated 501 and the known signal 502 are evaluated over a duration equal to that of the correcting filter. The vector [x] solving the system of equations $[\Gamma]*[x]=[c]$ is then calculated in 505. This vector tends towards zero when the algorithm for calculating the coefficients has converged. It is integrated in 506 with the results of the preceding iterations of the algorithm; this integration constitutes the filtering of the feedback loop that constitutes the algorithm, but this filtering may take the form of a low-pass filter. A gain 507 is applied to the output vector of the integrator 506, the resulting vector corresponding to the coefficients [a] used by the adaptable correction filter 232. This is the feedback loop-gain and its position may be commuted with the filter/integrator 506.

The value of the coefficients of the adaptable correction filter 232 that are used for the first iteration matters little since these coefficients will subsequently converge towards their optimal value. One possible implementation consists in using zero coefficients for the first iteration, thus making the assumption that the effects of the coupling are weak. Advantageously, the first iteration of the algorithm may be carried out by the non-adaptive method described in FIG. 4, in order to minimize the duration of convergence of the algorithm.

The value of the gain 507 has an effect on the precision, the sensitivity and the convergence time of the algorithm. By choosing this value to be small, the convergence time of the algorithm will be long but the sensitivity to noise will be low and the precision of the measurement high. Conversely, by choosing this value to be large, the convergence time will be fast but the measurement will be more sensitive to noise. The value of this gain therefore comes down to an implementational choice and it may be made to change over time.

The different iterations of the adaptive method may be consecutive, so as to converge rapidly, or be spaced apart in time, so as to monitor the variations of the effects of the coupling while minimizing the calculations performed. The interval between two iterations may itself also be made to change over time.

In the non-adaptive case of FIG. 4 and in the adaptive case of FIG. 5, the computing load may be decreased by using a white noise as the known signal. Specifically, in this case, the autocorrelation matrix [Γ] is diagonal, and its diagonal term is equal to the variance $\sigma^2$ of the known signal. The calculation of the coefficients [a] calculated in 405 (or [x] calculated in 505, respectively) then has a value of:

$$[a] = \frac{[c]}{\sigma^2},$$

and its implementation requires only very few calculations.

When the known signal used is not a white noise, its autocorrelation matrix [Γ] may be calculated upstream of the processing and stored in a memory of the apparatus, the same as for its inverse matrix which therefore does not have to be recalculated in real time.

In the adaptive embodiment described in FIG. 5, and taking into account the convergence associated with the feedback, it is not essential to use exactly those relationships described above: approximations may be made with respect to the autocorrelation matrix, with certain reservations associated with the stability of the process, at the cost, however, of a decrease in the loop gain and consequently an increase in the convergence time, or even a decrease in precision if the loop filter is not an integrator. For example, in order to simplify the calculations of the coefficients, a diagonal approximation of the inverse matrix in which each block is proportional to the identity matrix may be used in the calculations 505 instead of the inverse of the autocorrelation matrix [Γ]. The solution to the system of equations will then be invariant as a function of the time index m, with $x_m = \gamma^* c_m$, where $x_m$ corresponds to the sample m of the vector that is the solution to the system of equations, $c_m$ corresponds to the sample m of the vector [c], and γ corresponds to the coefficient (m, m) of the diagonal approximation of the matrix $[\Gamma]^{-1}$. Solving the system of equations thus requires only very few calculations.

In order to simplify the calculations 404 or 504 for solving the system of equations while using a known signal other than a white noise, it is possible to whiten the known signal with the calculation of the coefficients of the correcting filters. Specifically, as seen above, the closer the known signal is to a white noise, the more the autocorrelation matrix [Γ] of the known noise tends towards a diagonal matrix. This property may be advantageous in particular when particular spectral constraints are imposed on the transmitted signal.

Figure 6:
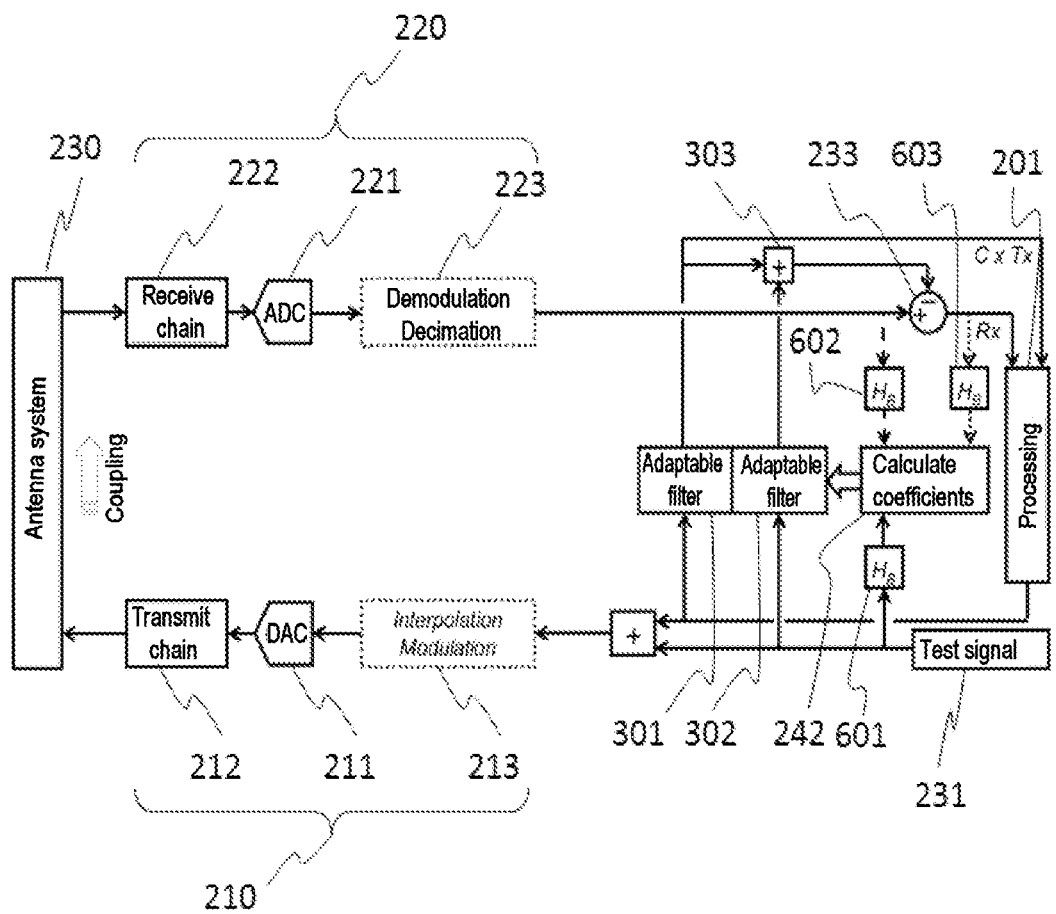
FIG. 6 schematically shows one embodiment of a method for decoupling signals according to the invention in which the signals are whitened.

FIG. 6 schematically shows another embodiment of a method for decoupling signals according to the invention, in which a whitening filter 601 is applied to the known signal. A whitening filter is a filter whose power frequency response is, ideally, the inverse of the power spectral density of the known signal. In practice, it is a reasonable (in terms of complexity) and achievable approximation of the inverse of the power spectral density. The same whitening filter is applied:
  to the signal received over the receive path before the calculations in the case of non-adaptive operation (602), or
  to the signal received over the receive path from which has been removed the equivalent coupling signal estimated in the case of adaptive operation (603).

The example of FIG. 6 is taken from the embodiment shown in FIG. 3, but the principle of whitening the signals used as inputs for the calculations of the coefficients of the correction filter applies to all of the embodiments of the method according to the invention.

The method for decoupling signals according to the invention also applies to a multi-antenna apparatus, of MIMO (multiple-input, multiple-output) apparatus type, i.e. to an apparatus for which the number of transmit paths and/or the number of receive paths is greater than 1.

Figure 7A:
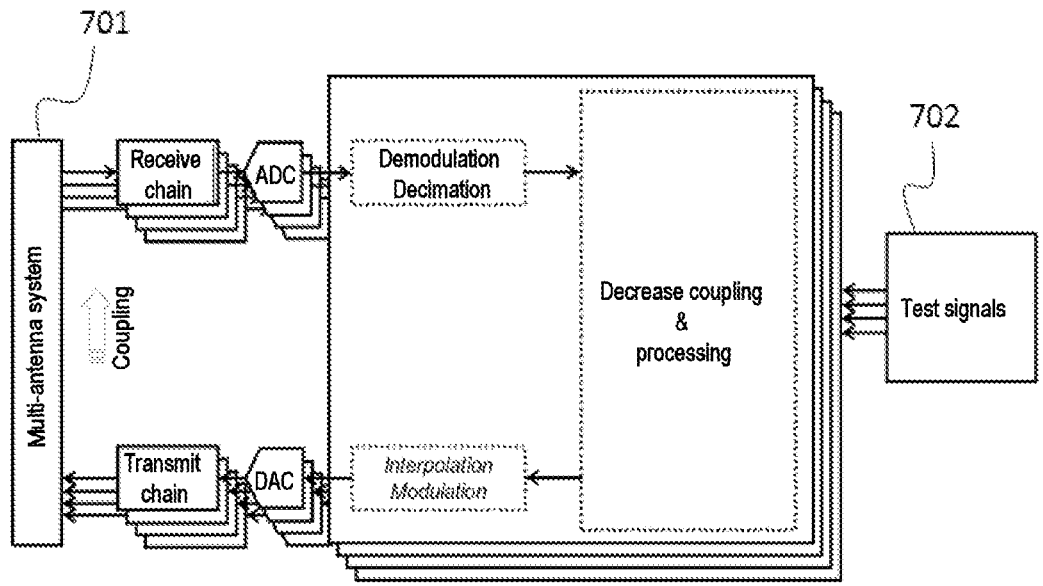
FIG. 7a schematically shows one embodiment of a method for decoupling signals according to the invention implemented in a multi-antenna apparatus.

FIG. 7a schematically shows one embodiment of a method for decoupling signals according to the invention, compatible with adaptive or non-adaptive operation, in which the antenna system 701 is a multi-antenna system. In the example shown, the transmitter apparatus comprises Q transmit ports and Q receive ports connected, respectively, to Q transmit paths and Q receive paths. In the example of FIG. 7a, Q is equal to 4. The antenna system may then be composed of Q antennas used both for transmission and for reception, or of Q transmit antennas and Q receive antennas. The method according to the invention applies similarly to apparatuses for which the number of transmit and receive paths differs.

In this scenario, the coupling which was scalar then takes matrix form. A known signal 702 is transmitted over each of the transmit paths in order to calculate the coefficients of an adaptable filter for each pair of transmit/receive paths.

Figure 7B:
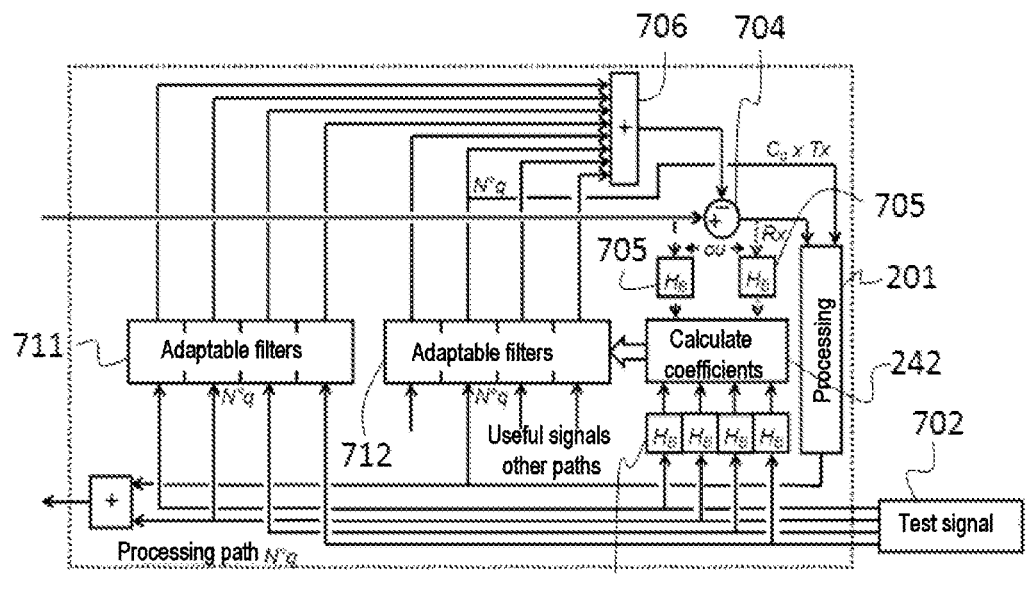

FIG. 7b shows, more precisely than in FIG. 7a, the processing carried out for this embodiment of a method for decoupling signals according to the invention implemented on a receive path. This method has to be implemented for each of the receive paths in order to clear the received signals of all of the coupling effects.

The method consists in transmitting a known signal 702 over each of the transmit paths, the Q known signals being independent and decorrelated from one another. One way of obtaining independent signals consists in transmitting them separately. Another way consists in simultaneously transmitting signals selected for their low levels of correlation. The known signals used to characterize the coupling between the different pairs of antennas may equally be generated in a centralized manner and distributed to the Q paths or be generated by each of the transmit paths and distributed to the receive paths.

On the basis of the signal received over the receive path before removal of the coupling effects (non-adaptive case) or thereafter (adaptive case) and of the different known signals transmitted, the coefficients of Q adaptive correcting filters 711 applied to the known signal are calculated.

Thereafter, each known signal is filtered by the corresponding adaptable correcting filter. The signal transmitted by path number q is also filtered by an adaptable correcting filter 712 whose coefficients are the same as that 711 filtering the known signal number q.

An estimate of the signal transmitted by path q and received by coupling effect is delivered by the output of the corresponding adaptable correcting filter 712. The outputs of the adaptable correcting filters 711 and 712 are summed in 706 in order to produce a coupled signal equivalent to the signal received by coupling effect over the receive path. This equivalent coupled signal may be subtracted in 704 from the signal received over each receive path, in order to remove the effects of the coupling.

Advantageously, and in order to simplify all of the calculations when the known signal is not a white noise, whitening filters 705 may be used to filter the known signals and the received signals.

The following equations describe the systems of equations allowing the coefficients of the adaptable correcting filters 711 and 712 to be determined, for a given receive path, in the case of FIG. 7b where the signals are whitened by a whitening filter 705. The following notation will be used: $a_k^{(q)}$ the coefficient k of the filter number q, with k varying from 0 to K with K+1 the number of coefficients of the correcting filters, $c_k^{(q)}$ the values of the estimated power correlation of the received signal with the known signal number q for the delay k, and $\Gamma^{(q,p)}$ the autocorrelation matrix of the known signal transmitted over the transmit path p with the known signal transmitted over the transmit path q.

Because the Q known signals are independent and decorrelated from one another, the global matrix of the system, whose dimension has been multiplied by Q with respect to the single-antenna case, is a block diagonal matrix. Advantageously, when the known signals have the same statistics (such as for example white noises of the same variance coloured by the same filtering), the Q diagonal blocks are identical and the Q whitening filters are too.

The system of equations to be solved to calculate the coefficients of the filters in the non-adaptive case, or to be integrated in the adaptive case, is the following:

with:

$$\begin{cases} [\Gamma^{(q,p)}] = \begin{bmatrix} \Gamma_0^{(p,p)} & \Gamma_{-1}^{(p,p)} & \cdots & \Gamma_{1-K}^{(p,p)} & \Gamma_{-K}^{(p,p)} \\ \Gamma_{+1}^{(p,p)} & \Gamma_0^{(p,p)} & \cdots & \cdots & \Gamma_{1-K}^{(p,p)} \\ \cdots & \cdots & \cdots & \cdots & \cdots \\ \Gamma_{+K-1}^{(p,p)} & \cdots & \cdots & \Gamma_0^{(p,p)} & \Gamma_{-1}^{(p,p)} \\ \Gamma_{+K}^{(p,p)} & \Gamma_{+K-1}^{(p,p)} & \cdots & \Gamma_{+1}^{(p,p)} & \Gamma_0^{(p,p)} \end{bmatrix} & p = q \\[2em] [\Gamma^{(q,p)}] = \begin{bmatrix} 0 & 0 & \cdots & 0 & 0 \\ 0 & 0 & \cdots & \cdots & 0 \\ \cdots & \cdots & \cdots & \cdots & \cdots \\ 0 & \cdots & \cdots & 0 & 0 \\ 0 & 0 & \cdots & 0 & 0 \end{bmatrix} & p \neq q \end{cases}$$

Although the embodiments described above make the implicit assumption that the coupling mechanism is linear, it is possible to apply the described method to the case where the effects of the coupling are non-linear, in as much as it is possible to extricate a simple model of the coupling. This extension is described hereinafter for a single-antenna embodiment, but also applies to the multi-antenna case.

In general, non-linear operation may be modelled by means of a distortion model composed by the sum of L components, with L greater than 1, each consisting of a distortion function $F^{(l)}$ of the input signal for the transmit chain:

$$s = \sum_{l=1}^{L} a^{(l)} F^{(l)} e,$$

with e and s, respectively, the incoming and outgoing signal of the non-linear function, and $a^{(l)}$ the coefficient of distortion associated with the l-order component.

One possible implementation consists in choosing $F^{(1)}(e)=e$, the l=1-order contribution translating the linear operation of the small-signal chain, the other contributions l=2 to L translating the non-linearities and occurring above all with a strong signal. One simple model commonly proposed is that of a 3-order polynomial development: $s=g^*(e+a^{(2)}e^2+a^{(3)}e^3)$, with g the gain of the amplifier.

In the context of the implementation of the method according to the invention, the non-linear coupling of the assembly consisting of the antenna system 230 flanked by the transmit chain 212 and by the receive chain 222 may be translated by the sum of L filtering operations applied, respectively, to the different contributions $F^l(e)$:

$$\begin{bmatrix} \begin{bmatrix} \Gamma_0^{(1,1)} & \Gamma_{-1}^{(1,1)} & \cdots & \Gamma_{1-K}^{(1,1)} & \Gamma_{-K}^{(1,1)} \\ \Gamma_{+1}^{(1,1)} & \Gamma_0^{(1,1)} & \cdots & \cdots & \Gamma_{1-K}^{(1,1)} \\ \cdots & \cdots & \cdots & \cdots & \cdots \\ \Gamma_{+K-1}^{(1,1)} & \cdots & \cdots & \Gamma_0^{(1,1)} & \Gamma_{-1}^{(1,1)} \\ \Gamma_{+K}^{(1,1)} & \Gamma_{+K-1}^{(1,1)} & \cdots & \Gamma_{+1}^{(1,1)} & \Gamma_0^{(1,1)} \end{bmatrix} & \begin{matrix} 0 & 0 & \cdots & 0 & 0 \\ 0 & 0 & \cdots & \cdots & 0 \\ \cdots & \cdots & \cdots & \cdots & \cdots \\ 0 & \cdots & \cdots & 0 & 0 \\ 0 & 0 & \cdots & 0 & 0 \end{matrix} & \cdots \\ \vdots & \vdots & [\Gamma^{(q,p)}] \\ \begin{matrix} 0 & 0 & \cdots & 0 & 0 \\ 0 & 0 & \cdots & \cdots & 0 \\ \cdots & \cdots & \cdots & \cdots & \cdots \\ 0 & \cdots & \cdots & 0 & 0 \\ 0 & 0 & \cdots & 0 & 0 \end{matrix} & \cdots & \begin{bmatrix} \Gamma_0^{(Q,Q)} & \Gamma_{-1}^{(Q,Q)} & \cdots & \Gamma_{1-K}^{(Q,Q)} & \Gamma_{-K}^{(Q,Q)} \\ \Gamma_{+1}^{(Q,Q)} & \Gamma_0^{(Q,Q)} & \cdots & \cdots & \Gamma_{1-K}^{(Q,Q)} \\ \cdots & \cdots & \cdots & \cdots & \cdots \\ \Gamma_{+K-1}^{(Q,Q)} & \cdots & \cdots & \Gamma_0^{(Q,Q)} & \Gamma_{-1}^{(Q,Q)} \\ \Gamma_{+K}^{(Q,Q)} & \Gamma_{+K-1}^{(Q,Q)} & \cdots & \Gamma_{+1}^{(Q,Q)} & \Gamma_0^{(Q,Q)} \end{bmatrix} \end{bmatrix} \times \begin{bmatrix} a_0^{(1)} \\ a_1^{(1)} \\ \vdots \\ a_{K-1}^{(1)} \\ a_K^{(1)} \\ \vdots \\ a_0^{(Q)} \\ a_1^{(Q)} \\ \vdots \\ a_{K-1}^{(Q)} \\ a_K^{(Q)} \end{bmatrix} = \begin{bmatrix} c_0^{(1)} \\ c_1^{(1)} \\ \vdots \\ c_{K-1}^{(1)} \\ c_K^{(1)} \\ \vdots \\ c_0^{(Q)} \\ c_1^{(Q)} \\ \vdots \\ c_{K-1}^{(Q)} \\ c_K^{(Q)} \end{bmatrix}$$

$$s_n = \sum_{l=1}^{L} \sum_{k} a_k^{(l)} F^{(l)}(e_{n-k}),$$

k varying from 0 to K, where K+1 is the number of coefficients of the correcting filters.

The method for decoupling signals described above is capable of continuously adapting to slow variations in the coupling that is associated with the antenna system while simultaneously performing the function of processing/transmitting the signal received by the antenna system. This comes from the fact that the transmit and receive chains are assumed to be linear. However, these embodiments cannot be transposed directly to the case where the transmit chain 212 is non-linear since, letting s denote the useful signal transmitted by the transmit path and b the known signal, the portion of $F^{(l)}(s+b)$ correlated with b or with $F^{(l)}(b)$ inevitably depends on the signal s itself. However, the method may be implemented in the case of a non-linear coupling, in the embodiments in which the known signal and the useful signal are transmitted separately.

Figure 8A:
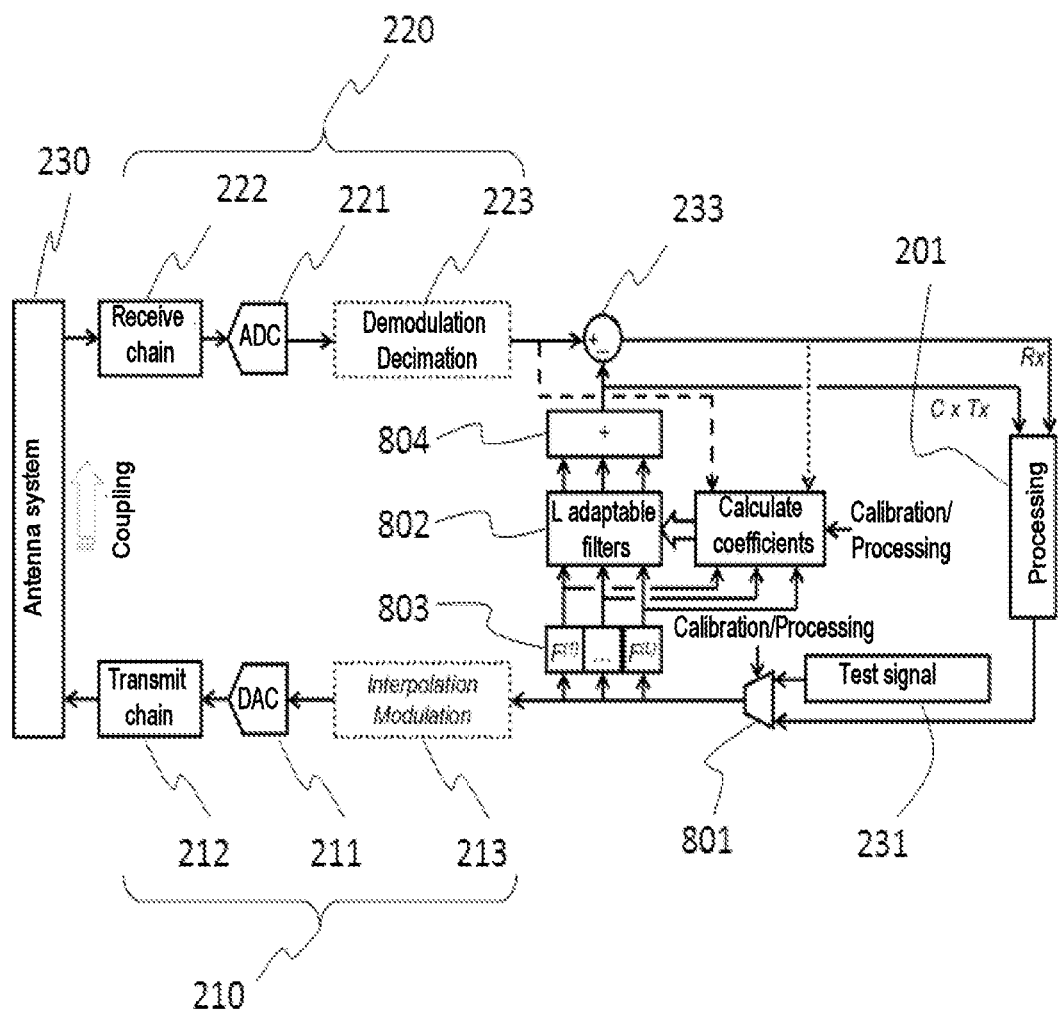
FIG. 8a schematically shows one embodiment of a method for decoupling signals according to the invention taking into account the non-linearities of the transmit chain.

FIG. 8a schematically shows one embodiment of a method for decoupling signals according to the invention taking into account the non-linearities of the coupling, for a single-antenna case. This embodiment requires prior knowledge of the coefficients of a model of the non-linearities of the apparatus. In the example of FIG. 8a, the chosen distortion model is an L-order polynomial model, with L components, but the invention applies identically to other non-linearity models.

A multiplexer 801 makes it possible to select the signal to be transmitted between the useful signal, coming from the processing 201, and the test signal 231, or known signal. In a first phase, referred to as the calibration phase, only the known signal is transmitted. In this calibration phase, the coefficients of L adaptable correcting filters 802 are calculated, each of the filters being associated with a distinct component of the distortion model associated with the apparatus. The calculations are carried out on the basis of the signal received over the receive path 220, after removal (adaptive case) or not (non-adaptive case) of the estimated coupling effects, and on the basis of L signals corresponding to the known signal 231 after separate application of each of the components of the polynomial model. These signals are then each filtered by the associated correcting filter 802, then summed 804, the resulting signal corresponding to the known signal received over the receive path by coupling effect.

In the processing phase, the transmission of the useful signal is selected by the switch 801. Each component of the distortion model is applied independently to the useful signal, and the resulting signals are filtered by the correcting filter 802 associated with the given component. The signals are then summed 804, in order to generate a signal equivalent to the useful signal received over the receive path by coupling effect. This equivalent signal may be subtracted in 233 from the received signal in order to remove the effects of the coupling between transmit antenna and receive antenna.

In this embodiment, optimized for the removal of the effects of coupling in an apparatus whose assembly consisting of the transmit chain, of the antenna system and of the receive chain is non-linear, the estimation and the compensation of the coupling effects cannot be carried out simultaneously. However, the evolution of the coupling effects is generally slow with respect to the convergence time of the algorithm. Thus, in the case where the calibration method is adaptive, after an initial phase of starting up and of convergence of the measurement of the coefficients of the correcting filters, the removal of the coupling effects from the received signals takes place efficiently. The measurement of the coefficients of the correcting filters may then be stopped as soon as a signal arrives at the antenna system, then resumed once it has gone. In practice, for the adaptive case, this may take place simply by deactivating the loop integrators 506 without resetting their outputs. The control for deactivation may be the same as that for the multiplexer 801.

The calculation of the coefficients of the correcting filters 802 that are associated with each of the components of the distortion model may be done by the calculation of L power correlations between the known signal, denoted by b, and the L distortion blocks $F^{(l)}$ of the compensation path:

$$c_m^{(p)} = E(s_n F^{(p)*}(b_{n-m}))$$
$$= E\left(F^{(p)*}(b_{n-m}) \sum_{l=1}^{L} \sum_{k} a_k^{(p)} F^{(l)*}(b_{n-k})\right)$$
$$= \sum_{l=1}^{L} \sum_{k} a_k^{(p)} E(F^{(p)*}(b_{n-m}) F^{(l)}(b_{n-k}))$$

with:
p the component of the distortion model in question,
$c_m^{(p)}$ the sample m of the vector $c^{(p)}$ corresponding to the correlation between the signal received over the receive path, before or after removal of the coupling effects, and the known signal multiplied by the component $F^{(p)}$,
n the current time index,
E( ) the operator denoting the mathematical expectation, and
k an index varying from 0 to K, where K+1 is the number of coefficients of the adaptable correcting filters 803.

If the known signal b may be considered to be stationary, then the known signals $b^{(l)} = F^{(l)}(b)$ after application of a component of the distortion model are also stationary. Thus:

$$c_m^{(l)} = \sum_{p=1}^{L} \sum_{k} a_k^{(p)} \Gamma_{m-k}^{(p,l)},$$

where the function $\Gamma^{(l,p)}$ is the power correlation function of the signals $b^{(l)}$ and $b^{(p)}$ defined by:

$$\Gamma_k^{(p,l)} = E(b_{n-k}^{(p)*} b_n^{(l)}).$$

The system $[\Gamma]*[a]=[c]$ then becomes:

$$\begin{bmatrix} \begin{bmatrix} \Gamma_0^{(1,1)} & \Gamma_{-1}^{(1,1)} & \cdots & \Gamma_{1-K}^{(1,1)} & \Gamma_{-K}^{(1,1)} \\ \Gamma_{+1}^{(1,1)} & \Gamma_0^{(1,1)} & \cdots & \cdots & \Gamma_{1-K}^{(1,1)} \\ \cdots & \cdots & \cdots & \cdots & \cdots \\ \Gamma_{+K-1}^{(1,1)} & \cdots & \cdots & \Gamma_0^{(1,1)} & \Gamma_{-1}^{(1,1)} \\ \Gamma_{+K}^{(1,1)} & \Gamma_{+K-1}^{(1,1)} & \cdots & \Gamma_{+1}^{(1,1)} & \Gamma_0^{(1,1)} \end{bmatrix} & \cdots & \begin{bmatrix} \Gamma_0^{(1,L)} & \Gamma_{-1}^{(1,L)} & \cdots & \Gamma_{1-K}^{(1,L)} & \Gamma_{-K}^{(1,L)} \\ \Gamma_{+1}^{(1,L)} & \Gamma_0^{(1,L)} & \cdots & \cdots & \Gamma_{1-K}^{(1,L)} \\ \cdots & \cdots & \cdots & \cdots & \cdots \\ \Gamma_{+K-1}^{(1,L)} & \cdots & \cdots & \Gamma_0^{(1,L)} & \Gamma_{-1}^{(1,L)} \\ \Gamma_{+K}^{(1,L)} & \Gamma_{+K-1}^{(1,L)} & \cdots & \Gamma_{+1}^{(1,L)} & \Gamma_0^{(1,L)} \end{bmatrix} \\ \vdots & [\Gamma^{(l,p)}] & \vdots \\ \begin{bmatrix} \Gamma_0^{(L,1)} & \Gamma_{-1}^{(L,1)} & \cdots & \Gamma_{1-K}^{(L,1)} & \Gamma_{-K}^{(L,1)} \\ \Gamma_{+1}^{(L,1)} & \Gamma_0^{(L,1)} & \cdots & \cdots & \Gamma_{1-K}^{(L,1)} \\ \cdots & \cdots & \cdots & \cdots & \cdots \\ \Gamma_{+K-1}^{(L,1)} & \cdots & \cdots & \Gamma_0^{(L,1)} & \Gamma_{-1}^{(L,1)} \\ \Gamma_{+K}^{(L,1)} & \Gamma_{+K-1}^{(L,1)} & \cdots & \Gamma_{+1}^{(L,1)} & \Gamma_0^{(L,1)} \end{bmatrix} & \cdots & \begin{bmatrix} \Gamma_0^{(L,L)} & \Gamma_{-1}^{(L,L)} & \cdots & \Gamma_{1-K}^{(L,L)} & \Gamma_{-K}^{(L,L)} \\ \Gamma_{+1}^{(L,L)} & \Gamma_0^{(L,L)} & \cdots & \cdots & \Gamma_{1-K}^{(L,L)} \\ \cdots & \cdots & \cdots & \cdots & \cdots \\ \Gamma_{+K-1}^{(L,L)} & \cdots & \cdots & \Gamma_0^{(L,L)} & \Gamma_{-1}^{(L,L)} \\ \Gamma_{+K}^{(L,L)} & \Gamma_{+K-1}^{(L,L)} & \cdots & \Gamma_{+1}^{(L,L)} & \Gamma_0^{(L,L)} \end{bmatrix} \end{bmatrix} \times \begin{bmatrix} a_0^{(1)} \\ a_1^{(1)} \\ \vdots \\ a_{K-1}^{(1)} \\ a_K^{(1)} \\ \vdots \\ \vdots \\ a_0^{(L)} \\ a_1^{(L)} \\ \vdots \\ a_{K-1}^{(L)} \\ a_K^{(L)} \end{bmatrix} = \begin{bmatrix} c_0^{(1)} \\ c_1^{(1)} \\ \vdots \\ c_{K-1}^{(1)} \\ c_K^{(1)} \\ \vdots \\ \vdots \\ c_0^{(L)} \\ c_1^{(L)} \\ \vdots \\ c_{K-1}^{(L)} \\ c_K^{(L)} \end{bmatrix}$$

20

Since the known signals are centred, and therefore of zero average value, the distortion functions may advantageously be divided into two: even, symmetric functions $S^{(l)}$, and odd, antisymmetric functions $A^{(l)}$. This is the case for example when the known signal used for the calibration is a white noise. In this case, the problem is decoupled completely into two independent sub-problems, one relating to the symmetric functions and the other to the antisymmetric functions:

$$E(A^{(p)*}(b_n)S^{(l)}(b_{n-k})) = E(S^{(p)*}(b_n)A^{(l)}(b_{n-k})) = 0 \begin{cases} \forall\, p, \forall\, l \\ \forall\, n, \forall\, k \end{cases}.$$

In the particular case where the known signal e is also independent from one sample to the next (and therefore white):

$$\begin{cases} E(A^{(p)*}(b_n)A^{(l)}(b_{n-k})) = \begin{cases} E(A^{(p)*}(b)A^{(l)}(b)) & k = 0 \\ 0 & k \neq 0 \end{cases} \\ E(S^{(p)*}(b_n)S^{(l)}(b_{n-k})) = \begin{cases} E(S^{(p)*}(b)S^{(l)}(b)) & k = 0 \\ E^*(S^{(p)}(b))E(S^{(l)}(b)) & k \neq 0 \end{cases} \end{cases}$$

As seen above in the case where the transmit chain is linear, since the signal used for the calibration and the distortion functions are known, the matrix $[\Gamma]$ of the system and its inverse are therefore also known too. They may be pre-calculated and stored in memory. The solution to the system of equations above consists of a set of known linear equations linking the coefficients of the correcting filters (for the non-adaptive case) or their derivative (for the adaptive case).

However, similarly to the linear case, it is not essential to use these relationships in the case of an adaptive algorithm, taking into account the convergence associated with the feedback. Approximations may be entirely sufficient, with certain reservations associated with the stability of the process and with the cost of a decrease in the loop gain and consequently an increase in the convergence time. A block diagonal approximation of the inverse matrix may then advantageously be used, in which each block is proportional to the identity matrix. The solution will then be invariant as a function of the time index m:

$$x_m^{(l)} = \sum_{p=1}^{L} \gamma^{(l,p)} c_m^{(p)},$$

where $\gamma^{(l,p)}$ corresponds to the coefficient (m, m) of the diagonal approximation of the matrix $[\Gamma^{(l,p)}]^{-1}$, thus making the calculations non-complex to implement.

As in the case of the method in its linear version described in FIGS. 4 and 5, the closer the known signal used to calibrate the method is to a white noise, the more the matrix of the system tends towards such a block diagonal matrix. Some advantageous embodiments therefore consistent in using a white noise as the known signal for the calibration, or in whitening the noise in the calculation of the correlations by means of a whitening filter.

Figure 8B:
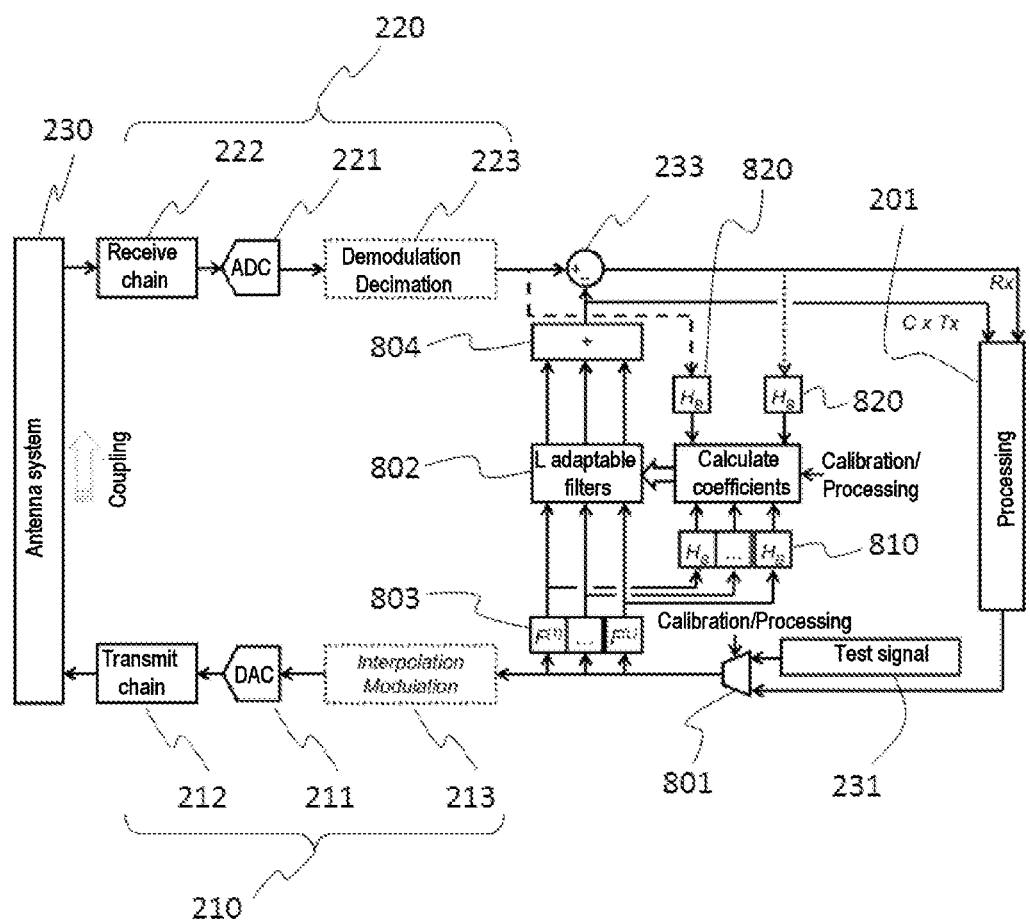
FIG. 8b schematically shows one embodiment of a method for decoupling signals according to the invention taking into account the non-linearities of the transmit chain in which the signals are whitened.

FIG. 8b schematically shows one embodiment of a method for decoupling signals according to the invention taking into account the non-linearities of the coupling, for a single-antenna case, in which a whitening filter 810 is used in the calibration phase to whiten each of the signals after application of a coefficient of the non-linearity model. The received signal used for the calculation of the coefficients must also be whitened by the same whitening filter 820. This embodiment makes it possible to use, as the known signal, a signal other than a white noise, while benefitting from the simplification of the calculations inherent to the use of a white noise-type signal.

The method for decoupling the signals transmitted between the input antenna and the output antenna radio apparatus via the effect of coupling is completely digital method that may be implemented on a digital computing device common to the processing 201 or on an independent device. It takes the form of software embedded in a component such as a processor, a digital signal processor (DSP), or a specialized circuit such as an ASIC (application-specific integrated circuit) or an FPGA (field-programmable gate array). When it is independent, the computing device generates a known signal 231 allowing the calculation of the coefficients of the correcting filters. It takes as inputs the signal received over the receive path 220, before or after removal of the effects of the coupling depending on whether the implementation is non-adaptive or adaptive, and/or the useful signal generated by the processing device 201. Advantageously, it may also take as inputs a model of non-linearities of the radio apparatus. It calculates the coefficients of one or more error correcting filters 232, 301, 711 or 802, and delivers an estimate of the signal received by coupling over the receive path and/or a signal corresponding to the signal received over the receive path from which the effects of the coupling have been removed.

Using known signals, most of the calculations required to solve the system of equations allowing the coefficients of the correcting filters to be determined may be performed in an upstream phase and stored in memory, which facilitates execution and allows real-time implementation of the method.

It does not require slicing of the transmissions and of the receptions, and adapts to a multi-antenna case. In this case, the method uses as many test signals as there are transmit paths, the signals being independent of one another. The method carries out the estimation of the effects of the coupling for each transmit path/receive path pair.

In some embodiments, the method makes it possible to continuously calculate the coefficients of the correcting filters that are used to reproduce the parasitic effects from the transmission/reception coupling. In others, in particular when the useful signal to be transmitted is gappy (for example for the transmission of pulsed signals), the step of calculating the coefficients of the correcting filters may be performed when the circuit has no useful signal to transmit, the process of calculating the coefficients being fixed within these periods. These operating modes make it possible to decrease the transmission dynamic range of the circuit with respect to the case where the useful signal and the known signal are transmitted simultaneously.

The embodiments for which the transmission of the known signal and of the useful signal are carried out separately may be extended to the cases where the apparatus coupling response is non-linear, when an equivalent distortion model is defined. In this case, a correcting filter will be calculated for each of the components of this distortion model. The filters will be used to calculate as many correction signals as there are components of the distortion model. The coefficients of the filters are determined via the estimate of the correlation of the received signal with the different correction signals.

The invention claimed is:

1. Method for characterizing effects of coupling in a radiofrequency transceiver apparatus comprising at least one transmit path and at least one receive path, said effects of coupling occurring between a transmit path among the said at least one transmit path and a receive path among the said at least one receive path, the method comprising a calculation of coefficients of a correcting filter comprising:
 a step of transmitting a known signal over the said transmit path, the known signal being used to characterize effects of coupling in the radiofrequency transceiver apparatus,
 a step of receiving a signal over the said receive path, said signal received over the said receive path comprising the known signal transmitted over the said transmit path,
 a step of calculating the coefficients of the correcting filter on the basis of the known signal and of the signal received over the said receive path,
 the method being characterized in that it further comprises a step, carried out during transmission of a useful signal over the said transmit path, of filtering a signal transmitted over the said transmit path comprising the useful signal by means of said correcting filter in order to determine a transmitted signal received by coupling effect over the said receive path, referred to as an equivalent coupled signal.

2. Method for characterizing the effects of coupling according to claim 1, comprising an additional step of calculating the difference between the signal received over the receive path and the equivalent coupled signal.

3. Method for characterizing effects of coupling according to claim 2, wherein the step of calculating the coefficients of the correcting filter comprises solving a system of equations that is formed from a vector of power correlation between the known signal and the signal received over the said receive path, and from an autocorrelation matrix of the known signal.

4. Method for characterizing effects of coupling according to claim 2, wherein the step of calculating the coefficients of the correcting filter is carried out iteratively and comprises integrating results obtained by solving a system of equations involving the known signal and the signal received over the said receive path minus the said equivalent coupled signal.

5. Method for characterizing effects of coupling according to claim 4, wherein the system of equations is formed:
 from a vector of power correlation between the known signal and the received signal minus the said equivalent coupled signal, and
 from an autocorrelation matrix of the known signal.

6. Method for characterizing effects of coupling according to claim 1, wherein the step of calculating the coefficients of the correcting filter comprises solving a system of equations that is formed from a vector of power correlation between the known signal and the received signal received over the said receive path, and from an autocorrelation matrix of the known signal.

7. Method for characterizing effects of coupling according to claim 1, wherein the step of calculating the coefficients of the correcting filter is carried out iteratively and comprises integrating results obtained by solving a system of equations involving the known signal and the signal received over the said receive path minus the said equivalent coupled signal.

8. Method for characterizing effects of coupling according to claim 4, wherein the system of equations is formed:
 from a vector of power correlation between the known signal and the received signal received over the said receive path minus the said equivalent coupled signal, and
 from an autocorrelation matrix of the known signal.

9. Method for characterizing effects of coupling according to claim 1, wherein the known signal is a white noise.

10. Method for characterizing effects of coupling according to claim 1, wherein signals used to calculate the coefficients of the correcting filter are filtered by a whitening filter.

11. Method for characterizing effects of coupling according to claim 1, wherein the transceiver apparatus comprises a plurality of transmit paths and/or a plurality of receive paths, wherein the coefficients of the correcting filter are calculated for each pair of transmit and receive antennas, and wherein, for each receive path, an equivalent coupled signal corresponding to each transmit path is calculated.

12. Method for characterizing effects of coupling according to claim 1, wherein the known signal and the useful signal are transmitted separately.

13. Method for characterizing effects of coupling according to claim 1, wherein the known signal and the useful signal are transmitted simultaneously.

14. Method for characterizing effects of coupling according to claim 12, wherein non-linearities of the said transmit path of the apparatus are modelled by a distortion model with L components, and for which a correcting filter is calculated for each component of the distortion model, the signal transmitted over the said transmit path being processed independently by each of the L components of the distortion model and filtered by the respective correcting filter, the outputs of each of the L correcting filters being summed in order to determine the said equivalent coupled signal.

15. Transceiver device for a radiofrequency signal comprising at least one transmit path and at least one receive path, which is configured to implement a method for characterizing effects of coupling according to claim 1.

* * * * *